United States Patent Office 3,297,586
Patented Jan. 10, 1967

3,297,586
VANADIUM COMPLEXES AND POLYMERIZA-
TION CATALYST PREPARED THEREFROM
Edward W. Duck and Philip M. Duinker, Amsterdam,
Netherlands, assignors to Shell Oil Company, New
York, N.Y., a corporation of Delaware
No Drawing. Filed Dec. 29, 1964, Ser. No. 422,035
Claims priority, application Netherlands, Mar. 20, 1961,
262,576
9 Claims. (Cl. 252—431)

This is a continuation-in-part of Serial No. 179,221, filed March 12, 1962, now U.S. Patent No. 3,222,333.

This invention relates to novel vanadium complexes, suitable for use as catalyst components in the polymerization and copolymerization of olefinically unsaturated hydrocarbons; to catalysts comprising said complexes; and to the preparation of said complexes and catalysts.

Patent No. 3,222,333 is directed to processes in which the products of the present invention catalyze polymerization reactions.

It has been known for some time that rubber-like copolymers of ethylene with propylene or with higher alpha-olefins can be made by carrying out the copolymerization in the presence of certain vanadium compounds combined with suitable reducing agents. Vanadium compounds that have been proposed for such use are generally from the group consisting of vanadium halides, e.g., $VCl_3$ and $VCl_4$, vanadium oxytrichloride ($VOCl_3$) and trialkyl esters of orthovanadic acid. A great drawback of these vanadium compounds is that they are very unstable in contact with air, water, dilute acids and dilute alkalis. $VOCl_3$ has the further disadvantage of being corrosive. The orthovanadic alkyl esters are difficult to prepare.

We have found novel, non-corrosive, easy-to-prepare, oil-soluble vanadium compounds which are relatively stable to air, water and dilute acids, which are hydrolyzed by dilute alkalis far less rapidly than the vanadyl compounds used heretofore, and which are advantageous for use as catalyst components in said copolymerization processes.

It is an object of this invention to provide novel vanadium complexes.

It is a further object to provide novel catalyst components and compositions suitable, i.a., for use in the production of copolymers of unsaturated compounds by low pressure polymerization processes.

Other objects are to provide methods for the preparation of said complexes and catalysts.

The novel vanadium complexes of this invention are complexes of vanadyl salts with certain aromatic carboxylic acids, namely, acids which are substituted in the aryl nuclei by one or more OH and/or SH groups. Novel catalysts result when said complexes are combined with metal-organic reducing compounds.

Catalysts produced from vanadium complexes of this invention have been successfully used in the homopolymerization of butadiene to lead to a product consisting of 100% trans-1,4-butadiene. The catalysts are not generally suitable, however, for use in stereoregular homopolymerization of alpha-monoolefins or of all diolefins. Catalysts of this invention are very suitable for use in copolymerization of ethylene with proplyene, and of ethylene, propylene or mixtures of ethylene and proplyene with higher alpha-monoolefins or with conjugated or non-conjugated diolefins or with mixtures of higher monoolefins and conjugated or non-conjugated diolefins.

Polymerization and product recovery may be carried out at known conditions, as described, for example, in our application Serial No. 179,221, now U.S. Patent No. 3,222,333. Liquid phase polymerization in the presence of an organic diluent, usually a hydrocarbon, is preferred.

Suitable temperatures during polymerization are between $-20°$ C. and $150°$ C., preferably between $0°$ and $70°$ C. Use of higher and lower temperatures, however, is not precluded.

Suitable pressures, if gaseous monomers are polymerized, lie between 1 and 50 atm. abs. Use of higher or lower pressures is not precluded.

THE NOVEL VANADIUM COMPLEXES

The vanadium complexes of this invention result from the reaction of vanadyl cations with anions of appropriate aromatic carboxylic acids. They can be readily prepared, for example, by reaction of alkali (including ammonium) salts of such aromatic carboxylic acids with simple vanadyl salts in an aqueous medium at room temperature. A complex precipitates during this reaction; it can be separated and purified, such as by extraction and recrystallization, for instance by means of gasoline or benzene. While the complex is suitably recovered by extraction with a hydrocarbon such as gasoline and recrystallization from solution, other methods, such as sublimation, dialkysis and chromatography may also be employed. However, extraction in hydrocarbon solvent is generally a preferred final recovery step. It may be followed by drying, such as by contact with molecular sieves. Several methods of preparation are illustrated hereafter by specific examples.

The aromatic carboxylic acids whose anions become part of the vanadium complexes of this invention are substituted in the aryl nucleus by one or more OH and/or SH groups. Particularly preferred are aromatic hydroxy-carboxylic acids which are further substituted in the aromatic nucleus by one or more hydrocarbon radicals. Defined more specifically, the acids are aromatic carboxylic acids having at least one carboxyl group (—COOH) and at least one group —XH wherein X represents a chalcogen, preferably, in order of preference, oxygen or sulfur. The preferred compounds contain one —COOH and one —XH group in ortho position to each other. In the preferred compounds, the same aromatic nucleus which contains the —XH and —COOH groups also is substituted with one or more hydrocarbyl groups which preferably are alkyl groups of 1 to 12 carbon atoms and most preferably of 2 to 6 carbon atoms; isopropyl, isobutyl and tertiary butyl groups are especially preferred. The substituted aromatic ring may be attached to one or more other aromatic rings. Preferred are those compounds having a single aromatic ring or two condensed aromatic rings, as in naphthalene.

The following are illustrative or suitable acids for the production of vanadium complexes for use in this invention; dialkylsalicylic acids, e.g., diisopropylsalicylic acid and 3,5-di-tert butyl salicylic acid; di-n-dodecyl-salicylic acid; naphthalene-2-hydroxy-3-carboxylic acids substituted by alkyl groups, e.g., diisopropyl-2-hydroxynaphthalene-3-carboxylic acid; naphthalene-2-hydroxy-1-carboxylic acids, e.g., diisopropyl-2-hydroxynaphthalene-1-carboxylic acid; and dihydroxynaphthalene carboxylic acids substituted by alkyl groups. Also suitable are the mercapto-analogs of the named hydroxyl-containing compounds, e.g., 2-mercapto-3,5-diisopropyl benzoic acid, diisopropyl-2-mercaptonaphthalene-1-carboxylic acid, etc.

When the vanadium complex is prepared in aqueous solution, the aromatic acids are employed in the form of water-soluble salts thereof. Especially preferred are the sodium and ammonium salts. Other alkali metal salts may also be employed.

In non-aqueous systems, the vanadium complexes of this invention can be prepared directly from the appropriate free carboxylic acids.

When the vanadium complex is prepared in aqueous solution, the vanadium is introduced in the form of a water-soluble vanadyl salt, i.e., a salt whose cation is VO++. A preferred salt, because of its ready availability and its unobjectionable anion, is vanadyl sulfate (VOSO$_4$). Other inorganic vanadium (IV) salts may be used, e.g., vanadyl chloride (VOCl$_2$), and bromide (VOBr$_2$).

It has been established through a variety of analytical methods that the vanadyl complexes of this invention are chemical compounds and not merely mixtures of vanadyl salts and organic acid salts. The complexes do not correspond to any simple chemical formula. Several molecules of the complexes may be associated in polymeric form. Residual metal cation or free acid may remain in the complex, depending on the conditions employed in preparing it, unless special measures are taken to purify it. However, the complexes need not be recovered in pure form to be useful in catalysis of polymerization reactions. For example, a study of olefin copolymerization showed that substantial variation in sodium or ammonium content of the complex exerted only some minor influence on intrinsic viscosity of the polymer produced, and no effect on catalyst activity.

The general formula of the complex may be represented as $(VOA_x)_n$ where A is the anion of the carboxylic acid, $x$ is a value between 2 and 3, and $n$ is generally a value between 1 and 5.

Complexes according to this invention can be prepared at a variety of conditions; different conditions may effect minor variations in the resulting product. For example, when the complex is prepared in an aqueous system having a pH of 6 or less, it may contain a significant amount of free carboxylic acid, but should be free of hydroxyl groups. When the preparation is carried out at basic conditions, with some excess of alkali cations, the complex may retain significant amounts of alkali cation and may also have hydroxyl groups bound to vanadium.

The complexes need not be purified to be useful as catalysts. However, various purification techniques may be employed if desired. For example, free acid may be removed from a complex of vanadyl salt and diisopropyl salicylic acid by a method such as vacuum sublimation at 90° C. Alkali metal cations may be removed, for example, by a method such as by treating a benzene solution of complex with dry HCl and removing the resulting chloride salt.

REDUCING COMPOUNDS

Reducing compounds suitable for use in the catalysts of this invention are selected from the group generally useful in Ziegler type catalysts consisting of organo-metallic compounds of metals from Groups 1, 2, 3 and 4b of the Mendeléef Periodic Table, as illustrated on page 28 of Ephraim, "Inorganic Chemistry," 6th English edition. Not all these compounds give identical results. For practical purposes, aluminum alkyl halides are greatly preferred, but other compounds, including compounds of the following metals, may sometimes be desirable:

Group 1—Li, Na, K, Rb, Cs
Group 2—Be, Mg, Ca, Zn, Sr, Cd, Ba, Hg
Group 3—B, Sc, Ga, Y, In, La
Group 4b—Ge, Sn, Pb The term "organo-metallic compound" means a compound in which the metal is directly attached to a carbon atom, but excluding metal carbides. Preferred are those organo-metallic compounds in which at least one hydrocarbon radical, most preferably an alkyl radical, and at least one halogen atom are attached to the metal. Any remaining valence or valences may be satisfied by hydrocarbon radicals, alkoxy or aryloxy radicals or halogen atoms. Preferred hydrocarbon radicals are alkyl radicals of 2 to 12 carbon atoms, and most preferred those of 2 to 6 carbon atoms. Metal-alkyl-chlorides are generally most preferred and corresponding bromides next most preferred.

Particularly preferred are aluminum dialkyl monohalides, aluminum monoalkyl dihalides and aluminum alkyl sesquihalides, most preferably chlorides, next preferably bromides, or mixtures of these aluminum alkyls in various ratios. These preferred aluminum compounds are part of a larger suitable group of the general formula $R_1R_2AlX$ wherein $R_1$ and $R_2$ are similar or dissimilar and each represents a hydrogen atom or a hydrocarbon radical such as an alkyl, alkaryl, aryl, aralkyl, alkenyl, cycloalkyl or cycloalkenyl radical and X represents a hydrogen atom, a halogen atom, an alkoxy group, or an aryloxy group, or the residue of a secondary amine or an amide, a mercaptan, a thiophenol, a carboxylic acid or a sulfonic acid; or of the general formula $R_1AlX_1X_2$ wherein $R_1$ has the same significance as stated above and $X_1$ and $X_2$ are similar or dissimilar and represent halogen atoms, alkoxy groups or aryloxy groups.

Letting Et=ethyl, Pr=n-propyl, iPr=isopropyl, Bu= n-butyl, iBu=isobutyl and Hex=n-hexyl, the preferred reducing compounds include AlEt$_2$Cl, AlEt$_{1.5}$Cl$_{1.5}$, AlEtCl$_2$, AliPr$_2$Cl, AlPrCl$_2$, AliPr$_{1.5}$Cl$_{1.5}$, AlBu$_2$Cl, AliBuCl$_2$, AliBu$_{1.5}$Cl$_{1.5}$, AlHex$_2$Cl, AlHexCl$_2$, AlHex$_{1.5}$Cl$_{1.5}$, AlEt$_2$Br, AlEt$_2$I, AlEt$_{1.5}$Br$_{1.5}$, and so forth.

The person skilled in Ziegler catalysis will be familiar with the useful organo-metallic reducing compounds and will be able to make appropriate selection thereof in the light of this description and the numerous publications in patents, journals and text books.

CATALYST PREPARATION

The catalyst is prepared by mixing the catalyst-forming components, i.e., the vanadium complex and the reducing compound, in the presence or absence of solid carrier, preferably in the presence of a diluent. If desired, the monomer to be polymerized may be present during mixing of the catalyst components, under conditions which favor polymerization or otherwise. The temperature during preparation of the catalyst is preferably between −20° and 150° C. The preparation of the catalyst can be effected either batchwise or continuously; the latter type of operation is desired in reaction mixtures of constant composition which are kept homogeneous. The catalyst components can be included in the mixing process either simultaneously or in any sequence. If desired, a considerable time may be allowed to elapse between the times at which the various components are included in the mixing process.

The ratios of the quantities of the catalyst components may vary between wide limits. When aluminum alkyl compounds are employed, the atomic ratio of aluminum to vanadium is as a rule between 1:1 and 20:1, but may be as high as 50:1 or more. Catalyst concentration in the reaction mixture is suitably between 0.1 and 100 millimols of vanadium compound per liter of reaction mixture.

If the catalyst-forming components are mixed in the presence of a liquid organic diluent and polymerization is also carried out in the presence of a diluent, it is preferred to choose the same medium for both phases of the process.

The following examples illustrate several methods for the preparation of the vanadium complexes of this invention and the Ziegler-type catalysts prepared from said complexes, and some of the advantages of the catalysts in olefin copolymerization and butadiene homopolymerization. The examples are not to be taken as limiting the invention.

EXAMPLE 1

*Preparation of reagents*

An aqueous solution of VOSO$_4$ is prepared by refluxing 0.5 mole of V$_2$O$_5$ and 0.55 mole of ethanol in 1 liter of 1.1 N sulfuric acid until an almost clear solution is obtained.

Crystalline 3,5-diisopropylsalicylic acid is prepared by adding about one half liter of 96% $H_2SO_4$ to 1.25 moles diisopropyl ether, then adding 45 ml. of water. One mole of salicylic acid is added and the mixture stirred at 65° C. for 14 hours. Pure acid is then recovered by dissolving the acid in benzene, extracting the resulting solution with 10% aqueous NaOH, extracting the sodium salt from the aqueous solution with petroleum ether, precipitating the acid by acidifying the extract, filtering, drying, and recrystallizing from petroleum ether.

*Preparation of complex*

The vanadyl sulfate solution is neutralized with ammonium hydroxide to a pH of 2.5 and added quickly, at room temperature and with stirring, to an aqueous solution containing about 1 mole per liter of diisopropyl salicylic acid and 1 mole per liter of $NH_4OH$. The molar ratio is 1 mole of $VOSO_4$ to 3 moles of ammonium diisopropylsalicylate. A dark blue vanadyl diisopropylsalicylate complex is precipitated. The precipitate is recovered by filtration, washed three times with water, and dissolved in pentane. The pentane layer is separated from the water layer, briefly shaken five times with water, dried on molecular sieves, and filtered. The complex is then freed of pentane and dried at about 60° C. under vacuum. The resulting dry solid is ground to a powder. Overall yield, based on $V_2O_5$, is about 92%.

EXAMPLE 2

Another typical preparation of a vanadium complex is carried out similarly to Example 1. The procedure is identical except that in this case the acid is employed in the form of its sodium salt, the molar ratio of vanadyl sulfate to sodium diisopropyl salicylate is about 1:2, and the final product is vacuum dried for 12 hours at 75° C. The elemental analysis of the resulting product is:

Element: Percent by weight
V _____ 6.9
Na _____ 2.0
C _____ 62.9
H _____ 6.8
O (by difference) _____ 21.4

This corresponds approximately to the formula

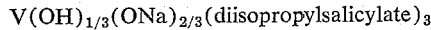
V(OH)$_{1/3}$(ONa)$_{2/3}$(diisopropylsalicylate)$_3$

On a sodium free basis the elemental analysis is

Element: Percent by weight
V _____ 7.0
C _____ 64.3
H _____ 6.9
O _____ 21.8

This corresponds approximately to vanadium$^{IV}$monohydroxytri(diisopropylsalicylate) or

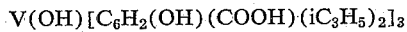
V(OH)[C$_6$H$_2$(OH)(COOH)(iC$_3$H$_5$)$_2$]$_3$

The complex vanadium compound is very soluble in organic solvents, including hydrocarbons, oxygenated hydrocarbons, chlorinated hydrocarbons and the like. It decomposes at about 120–130° C.

EXAMPLE 3

Example 2 is repeated, but with vanadyl sulfate and sodium diisopropylsalicylate in a molar ratio of about 1:3. Essentially identical complex is recovered in higher yield. Molar ratios of 1:4 and higher may also be used with good results.

EXAMPLE 4

The procedure of Example 1 is repeated with either ammonium or sodium cations present in molar ratios between about 3 and 4, per mole of vanadyl compound. The aqueous solution used in preparation of complexes contain $\frac{1}{15}$ mole $VOSO_4$ at a pH of 3 and $\frac{1}{15}$ mole diisopropylsalicylic acid plus an appropriate amount of NaOH or $NH_4OH$. The following tabulation illustrates the effect to varying Na:V and $NH_4$:V ratios on yield.

| Alkali Radical | Molar Ratio of Vi Alkali | Percent Yield, Basis V |
|---|---|---|
| Na$^+$ | 3.0 | 93.4 |
| | 3.15 | 95.0 |
| | 3.6 | 77.3 |
| | 3.9 | 57.3 |
| NH$_4^+$ | 3.0 | 96.0 |
| | 3.15 | 94.8 |
| | 3.75 | 92.5 |

EXAMPLE 5

The mixing of aqueous $VOSO_4$ and sodium salt of diisopropylsalicylic acid is carried out in one case according to Example 1 and in one case by adding the solution of sodium diisopropylsalicylate to the vanadyl sulfate solution. No significant difference in yield of complex or in constitution of complex is observed.

EXAMPLES 6–9

Two experiments (Examples 6 and 7) were carried out in flasks of 1000 ml. capacity. The flasks were filled with 800 ml. of isooctane and the contents at 50° C. saturated with an ethylene/propylene mixture, the molar ratio of ethylene to propylene being 40:60 and 20:80, respectively. Subsequently 4 millimoles of vanadium complex of diisopropylsalicylic acid (to be referred to sometimes herein as V–DIPS), prepared from vanadyl sulfate ($VOSO_4$) and sodium diisopropyl salicylate as described in Example 2, as well as 8 millimoles of aluminumisobutyl sesquichloride were added. Thereafter additional ethylene/propylene mixture was passed through each flask with stirring the temperature being maintained at 60° C. The polymerization which resulted was stopped after 1 hour by addition of ethanol. The copolymers were coagulated by further addition of ethanol. After washing and drying of the products, determinations were made of their intrinsic viscosity (in Decalin at 135° C), the weight percentage of the part soluble in cold hexane, the molar percentage of copolymerized propylene (by means of infrared analysis), as well as the ratio of the viscosity average molecular weight to the number average molecular weight ($M_v/M_n$). The results of these experiments are listed in Table 1. The data and results of two corresponding experiments, in which V–DIPS was replaced with $VOCl_3$ and VO(O-tert-butyl)$_3$, respectively, are included for comparison.

TABLE 1

| Example No. | Catalyst Components | Al Milli-atoms per l. | V Milli-atoms per l. | Ethylene/ Propylene Molar Ratio in Feed | Rate of Polymer Formation, g./l./hr. | Copolymer Properties ||||
|---|---|---|---|---|---|---|---|---|---|
| | | | | | | Intrinsic Viscosity, dl./g. | Soluble in Cold Hexane, percent weight | Propylene Content, percent mol | $M_v/M_n$ |
| 6 | Al$_2$(isobutyl)$_3$Cl$_3$+V–DIPS | 20 | 5 | 40:60 | 32 | 2.9 | 70 | 27 | 1.3 |
| 7 | Al$_2$(isobutyl)$_3$Cl$_3$+V–DIPS | 20 | 5 | 20:80 | 22 | 4.0 | 99 | 34 | 2.6 |
| 8 | Al$_2$(isobutyl)$_3$Cl$_3$+VOCl$_3$ | 20 | 5 | 40:60 | 72 | 2.9 | 99 | 43 | 5.6 |
| 9 | Al$_2$(isobutyl)$_3$Cl$_3$+VO(O-tert-butyl)$_3$ | 30 | 5 | 25:75 | 18.5 | 6.0 | 93 | 34 | 9.5 |

The data in Table 1 illustrate one substantial and outstanding difference between copolymers prepared with catalysts of this invention (Examples 6 and 7) and those prepared with prior art catalysts (Examples 8 and 9). This difference is the much lower ratio of $M_v/M_n$ for the copolymers prepared with catalysts of this invention. This is an indication of a much narrower distribution of molecular weight fractions in the copolymer.

EXAMPLE 10

Butadiene was polymerized in a manner similar to that described in Examples 6 and 7. 800 ml. benzene was used as solvent. 0.1 millimole per liter (mmol/l.) of V–DIPS and 10 mmols/l. of aluminum ethyl sesquichloride (calculated as $AlEt_{1.5}Cl_{1.5}$) were added as catalyst. 40 grams of gaseous butadiene was added during a period of two hours while the mixture was held at 5° C. The resulting product was 16 grams of polybutadiene, which analyzed 100% trans-1,4-polybutadiene.

EXAMPLES 11–13

In Examples 11 and 12, mixtures of ethylene, propylene, dicyclopentadiene and dodecene-1 were simultaneously polymerized to produce quaterpolymers. Both runs were carried out at 30° C. and 2 atmospheres absolute in 1000 ml. isooctane, using 0.3 mmol/l. of V–DIPS, 3 mmols/l. aluminum ethyl sesquichloride, 3 mmols/l. aluminum ethyl dichloride and 15 mmols/l. dicyclopentadiene. The amount of dodecene-1 in Example 11 was 6 grams per liter and in Example 12 12 g./l. A gaseous mixture of ethylene and propylene in a mole ratio of 30:70 was introduced at a rate of 200 l./hr. during a residence time of 1 hour.

The quaterpolymers obtained were vulcanized according to the following formulation:

| | |
|---|---|
| Copolymer | 100 |
| HAF carbon black | 50 |
| Zinc oxide | 5 |
| Stearic acid | 1 |
| Tetramethylthiuram disulfide | 0.75 |
| 2-mercaptobenzothiozole | 0.5 |
| Sulfur | 1 |

The properties of the product before and after vulcanization, as well as vulcanization temperature and time, are given in Table 2 together with similar conditions without dodecene (Example 13).

TABLE 2

| | Ex. 11 | Ex. 12 | Ex. 13 |
|---|---|---|---|
| BEFORE VULCANIZATION | | | |
| I.V. | 4.0 | 4.0 | 4.5 |
| Double bonds/1,000 C atoms | 6.0 | 5.5 | 3.5 |
| Cold Hexane solubility, percent wt. | 100 | 100 | 100 |
| DCPD content, percent of DCPD intake | 85 | 80 | 80 |
| $C_{12}''$ content, percent of $C_{12}''$ intake | 25 | 17 | |
| AFTER VULCANIZATION | | | |
| Vulcanization Temp., °C | 150 145 | 150 145 | 150 145 |
| Vulcanization Time, Min | 60 30 | 60 30 | 60 30 |
| Tensile strength, kg./cm.² | 245 234 | 248 200 | 224 216 |
| Elongation at break, percent | 250 294 | 251 336 | 285 378 |
| Modulus 200% | 151 109 | 150 86 | 102 84 |
| Modulus 300% | | 162 | 152 |
| Set at break, percent | 6 12 | 7 16 | 8 17 |

We claim as our invention:

1. A hydrocarbon-soluble, water-insoluble complex reaction product resulting from reacting in aqueous medium a vanadyl salt and a water-soluble salt of an aromatic carboxylic acid substituted on the same aromatic ring with at least one carboxyl group, at least one alkyl group of from 1 to 12 carbon atoms, and at least one group —XH wherein X is selected from the group consisting of sulfur and oxygen.

2. A composition according to claim 1 wherein said vanadyl salt is an inorganic vanadyl salt and said salt of an aromatic carboxylic acid is an alkali salt of a monocyclic aromatic carboxylic acid having as ring substituents at least one carboxyl group, at least one hydroxyl group, and at least one alkyl group of from 1 to 12 carbon atoms.

3. A hydrocarbon-soluble, water-insoluble complex reaction product resulting from reacting in aqueous medium one mole of vanadyl sulfate with from 2 to 4 moles of diisopropyl salicylic acid and from 0.9 to 1.3 moles of a water-soluble, inorganic base per mole of said acid, and recovering the precipitated complex.

4. A composition according to claim 3 wherein said inorganic base is NAOH.

5. A composition according to claim 3 wherein said inorganic base is $NH_4OH$.

6. A hydrocarbon-soluble, water-insoluble complex reaction product resulting from reacting in agitated aqueous solution at about room temperature about 1 mole of vanadyl sulfate with about 3 moles of ammonium-3,5-diisopropylsalicylate, recovering the resulting precipitate by filtration, washing it with water, dissolving it in a hydrocarbon solvent, drying the solution and removing the hydrocarbon solvent.

7. A polymerization catalyst comprising
  (a) an organo-metallic reducing compound of a metal from Groups 1, 2, 3 and 4b of the Periodic Table, and
  (b) a vanadium complex according to claim 1.

8. A polymerization catalyst comprising
  (a) an aluminum alkyl halide, and
  (b) a vanadium complex according to claim 2.

9. A polymerization catalyst consisting essentially of
  (a) an aluminum ethyl chloride, and
  (b) a vanadium complex according to claim 3.

References Cited by the Examiner

UNITED STATES PATENTS

| | | | |
|---|---|---|---|
| 1,933,520 | 10/1933 | Bruson | 106—222 |
| 2,197,835 | 4/1940 | Reiff | 252—42.7 |
| 2,962,451 | 11/1960 | Schreyer | 252—429 |
| 3,009,908 | 11/1961 | Andersen | 260—94.9 |

HELEN M. McCARTHY, *Acting Primary Examiner.*

TOBIAS E. LEVOW, J. G. LEVITT, *Assistant Examiners.*